Figure 1:
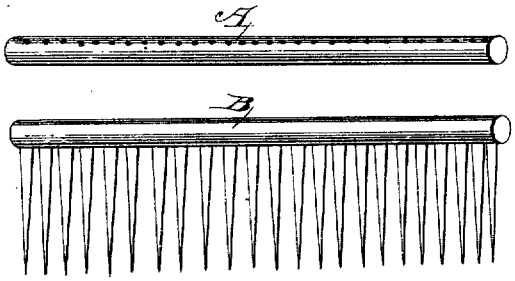
Figure 2:
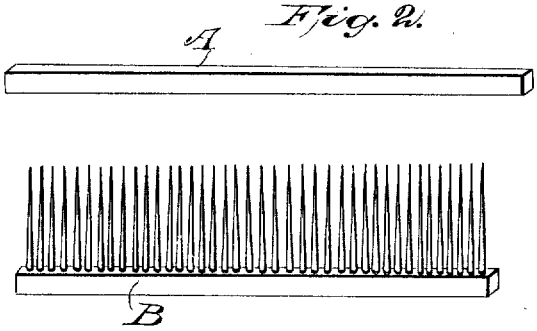
Figure 3:
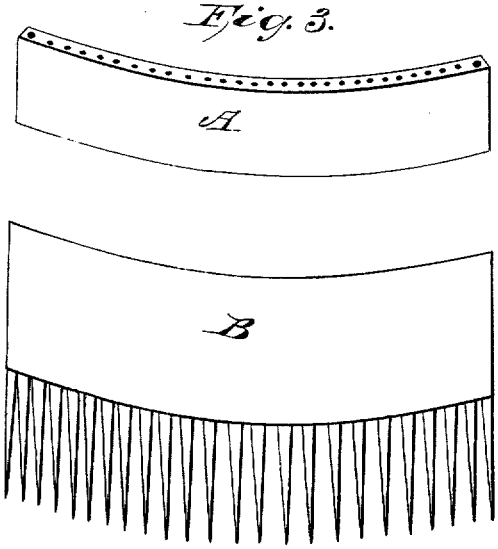

8258X

A. PORTER.

COMB.

Patented June 14, 1834.

8258X June 14. 1834 529

Allen Porter of Hartford Connecticut
Letters Patent.

The Schedule referred to in these Letters Patent and making part of the same containing a description in the words of the said Allen Porter himself of his improvement in the manufacture of Metal Combs.

To all whom these Presents shall come. Be it known that I Allen Porter of Hartford, County of Hartford and State of Connecticut have invented a new and useful improvement in the manufacture of Metal Combs, and that the following is a full and exact description of the construction of the Metal Combs as invented by me.

The back of the combs to be made of square, round, oval, or flat bars of metal curved in a suitable manner, and drilled so as to receive the teeth, after the teeth are put into the back to be compressed so as to keep them firm in the back, or the holes left small enough so as to admit of the teeth being driven into the back, to make them firm. The teeth to be made of wire. The teeth and back to be made of any kind of metal. Brass. Copper. Silver. Gold. or any kind of mixed metal. The improvement claimed is in fastening in the teeth without (soldering or rivetting or putting the teeth through the back as has formerly been practiced) by putting the teeth into the Back, so as to leave the back smooth without having the teeth come through the backs of the Comb. Hartford May 13th 1834.

Witnesses
Frederick E. Mather
Francis Parsons.

Allen Porter

Drawing 2,53 [illegible]